US009049139B2

(12) United States Patent
Kallarackal et al.

(10) Patent No.: US 9,049,139 B2
(45) Date of Patent: Jun. 2, 2015

(54) PERVASIVE NETWORK DIAGNOSTICS USING HBAS

(71) Applicant: Brocade Communications Systems, Inc., San Jose, CA (US)

(72) Inventors: Varghese Kallarackal, Sunnyvale, CA (US); Sathish Kumar Gnanasekaran, Sunnyvale, CA (US); Badrinath Kollu, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 94 days.

(21) Appl. No.: 13/791,367

(22) Filed: Mar. 8, 2013

(65) Prior Publication Data

US 2014/0010092 A1 Jan. 9, 2014

Related U.S. Application Data

(60) Provisional application No. 61/667,704, filed on Jul. 3, 2012.

(51) Int. Cl.
*H04L 12/26* (2006.01)
*G06F 3/06* (2006.01)
*H04L 29/08* (2006.01)
*H04L 12/861* (2013.01)

(52) U.S. Cl.
CPC ............. *H04L 43/18* (2013.01); *H04L 12/26* (2013.01); *G06F 3/067* (2013.01); *H04L 67/1097* (2013.01); *H04L 49/90* (2013.01)

(58) Field of Classification Search
CPC .................................. H04L 43/18; H04L 12/26
USPC ......................................................... 370/244
See application file for complete search history.

(56) References Cited

U.S. PATENT DOCUMENTS

2014/0146686 A1* 5/2014 Sakurai et al. ............. 370/241.1

* cited by examiner

*Primary Examiner* — Sai-Ming Chan
(74) *Attorney, Agent, or Firm* — Wong, Cabello, Lutsch, Rutherford & Brucculeri, L.L.P.

(57) ABSTRACT

Specially configured host bus adaptors (HBAs) are located in the switches in the fabric or added to a management server. The HBAs are programmed to perform higher level protocol analysis, such as monitoring exchanges, LUNs, and VM/LUN/LBA ranges and developing SCSI statistics on the flows. The HBA can detect protocol exceptions. When located in the switches, mirroring of the desired frames is simplified as all routing is handled internally to the switch, with the HBA/switch combination providing data over the management Ethernet port to a management server. To maintain performance, preferably only the protocol relevant frames are mirrored to the HBAs. With the data provided from the HBAs, in conjunction with the normal diagnostic and statistics data available from the switch itself, the management server can correlate events end-to-end, correlate I/O error statistics collected from the fabric with server statistics, and correlate performance statistics collected from the fabric with server statistics.

17 Claims, 7 Drawing Sheets

PERVASIVE NETWORK DIAGNOSTICS USING HBAS

RELATED APPLICATIONS

This application is a non-provisional application of Ser. No. 61/667,704, titled "Pervasive Network Diagnostic Using HBAs," filed Jul. 3, 2012, which is incorporated herein by reference.

TECHNICAL FIELD

The invention relates to diagnostics of communication network.

BACKGROUND

Network diagnostics are useful to detect numerous different errors in a network. Some limited analysis can be done from a single location using specific diagnostic commands, but those commands do not help with many different errors. In some cases, external analyzer units, such as those from LeCroy and JDS Uniphase for Fibre Channel (FC) networks are used in diagnostics. However, use of these types of analyzers creates its' own problems. First, the analyzers are expensive, and thus can be deployed at only a very limited number of locations. Second, the relevant network traffic must pass through the analyzer. Some FC switches have the capability to mirror frames at selected ports, simplifying the location of the analyzers, but if those switches are not present at the proper locations, the analyzer must still be placed in the desired path, if the path is even known. Thus mirroring merely simplifies the location of an analyzer in some instances, but it does not address the underlying cost issues. Thus, the use of analyzers for network diagnostics is limited to select problems. Certain other problems continue to be difficult and cannot be resolved with using analyzers.

Accordingly, an approach to cost effectively monitor the entire network is desirable to improve diagnosis of errors and issues in a network and to provide better overall network data.

SUMMARY OF THE INVENTION

In embodiments according to the present invention, specially configured host bus adaptors (HBAs) are located in the switches in the fabric or added to a management server. These HBAs are programmed not to handle normal FCP traffic with a server but to perform higher level protocol analysis, such as monitoring exchanges, LUNs, and VM/LUN/LBA ranges and developing SCSI statistics on data flows, such as count/MIN/MAX/AVG/timeout stats for I/Os, automatic base-lining of I/O statistics to detect outliers causing performance issues and VM level statistics based on LBA range monitors. In addition, these HBA can detect protocol exceptions. When located in the switches, mirroring of the desired frames is simplified as all routing is handled internally at the switch, with the HBA/switch combination providing data over the management Ethernet port to a management server.

To maintain performance, in a preferred embodiment of the present invention, only protocol relevant frames are mirrored to the HBAs. Such protocol relevant frames include the FCP_CMND command frame, the FCP_XFER_RDY transfer ready frame and the RCP_RSP response frame and the related link control frames, such as ACK acknowledgement frames, LS_RJT reject frames, LS_BSY busy frames and the like. The FCP_DATA data frames and related link control frames are not forwarded to the HBAs.

With the data provided from the HBAs, in conjunction with the normal diagnostic and statistics data available from a switch itself, the management server can correlate events end-to-end, correlate I/O error statistics collected from the fabric with server statistics and correlate performance statistics collected from the fabric with server statistics, as a few examples.

BRIEF DESCRIPTION OF THE DRAWINGS

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Analysis systems according to one embodiment of the present invention allow real time monitoring of an operational network, and troubleshooting and correlation of fabric events and data across switches for end-to-end analysis. The switches of the network include built-in monitoring capability for diagnostic assistance and statistical tracking. To supplement this built-in monitoring, an HBA is added, either to the switches or to servers, to perform more advanced monitoring functions.

Figure 1:
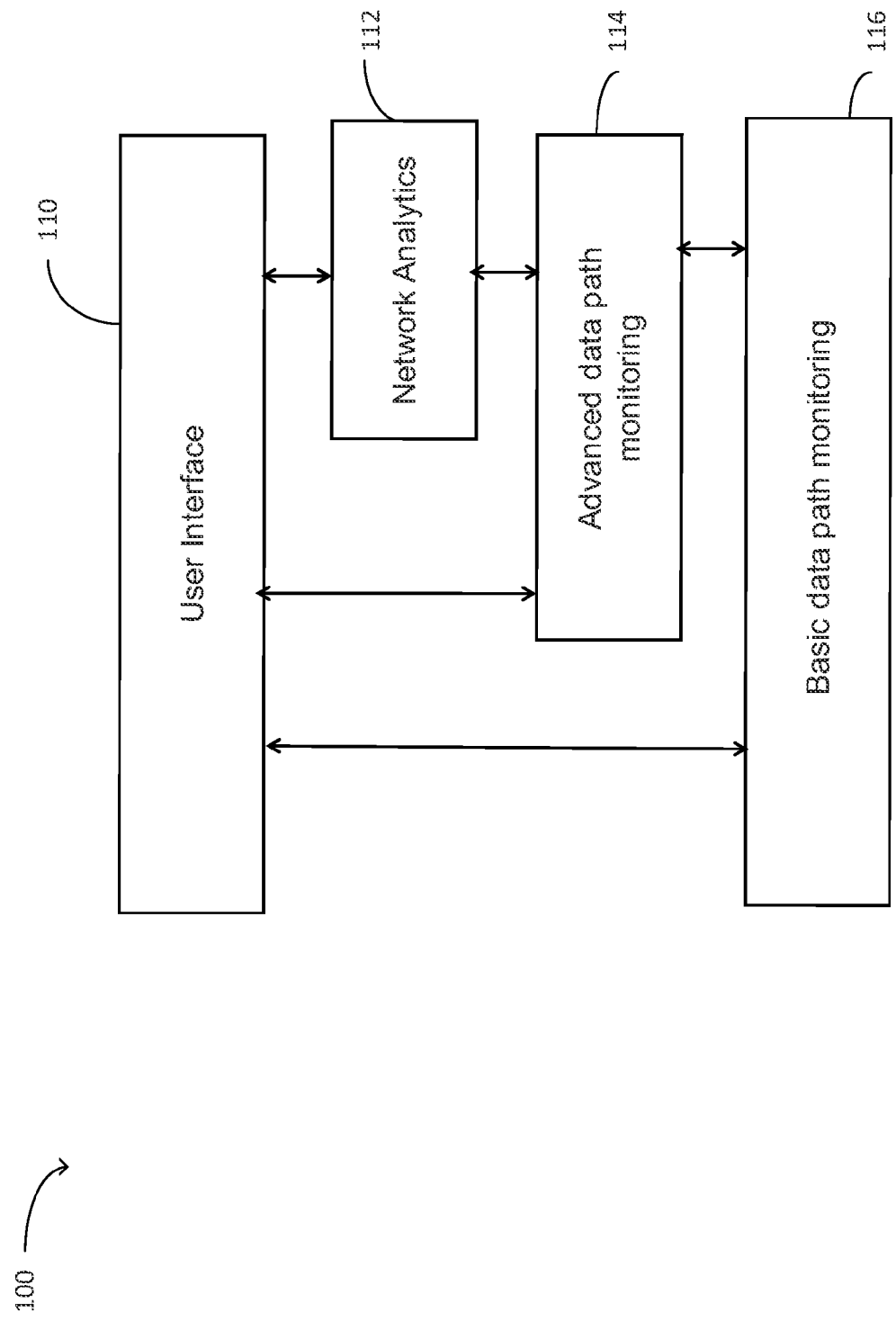
FIG. 1 is a block diagram of the analysis blocks according to the present invention.
Figure 2:
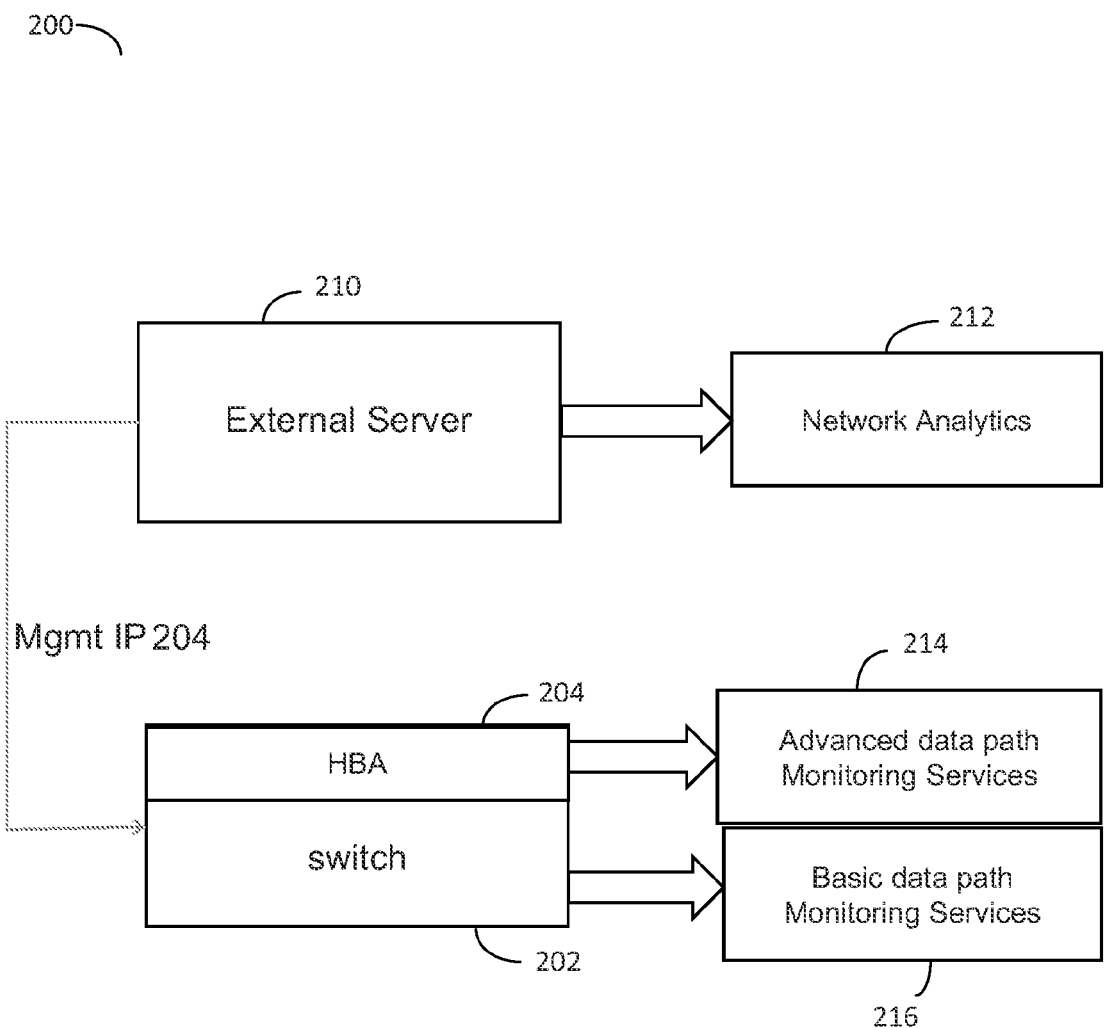
FIG. 2 is a block diagram of a first embodiment of an analysis system according to the present invention.

FIG. 1 illustrates a block diagram of the analysis blocks for network diagnostic system 100. As shown, the system includes a basic data path monitoring module 116 and an advanced data path monitoring module 114. A user interface no is in communication with the basic data path monitoring module 116, the advanced data path monitoring module 114 and a network analytics 112. The basic data path monitoring module 116 is also coupled to the advanced data path monitoring module 114, and the advanced data path monitoring module 114 is in turn coupled to the network analytics 112. The system 100 of FIG. 1 provides built-in monitoring. FIG. 2 illustrates a system 200, according to one embodiment of the present invention which supplements the basic monitoring of system 100 by adding an HBA to a switch. The switch 202 includes an HBA 204. The HBA 204 provides the advanced data path monitoring services 214 and the switch 202 itself provides the basic data path monitoring services 216. The switch 202 is coupled to an external server 210 via a management IP 204. The external server provides the network analytics 212.

Figure 3:
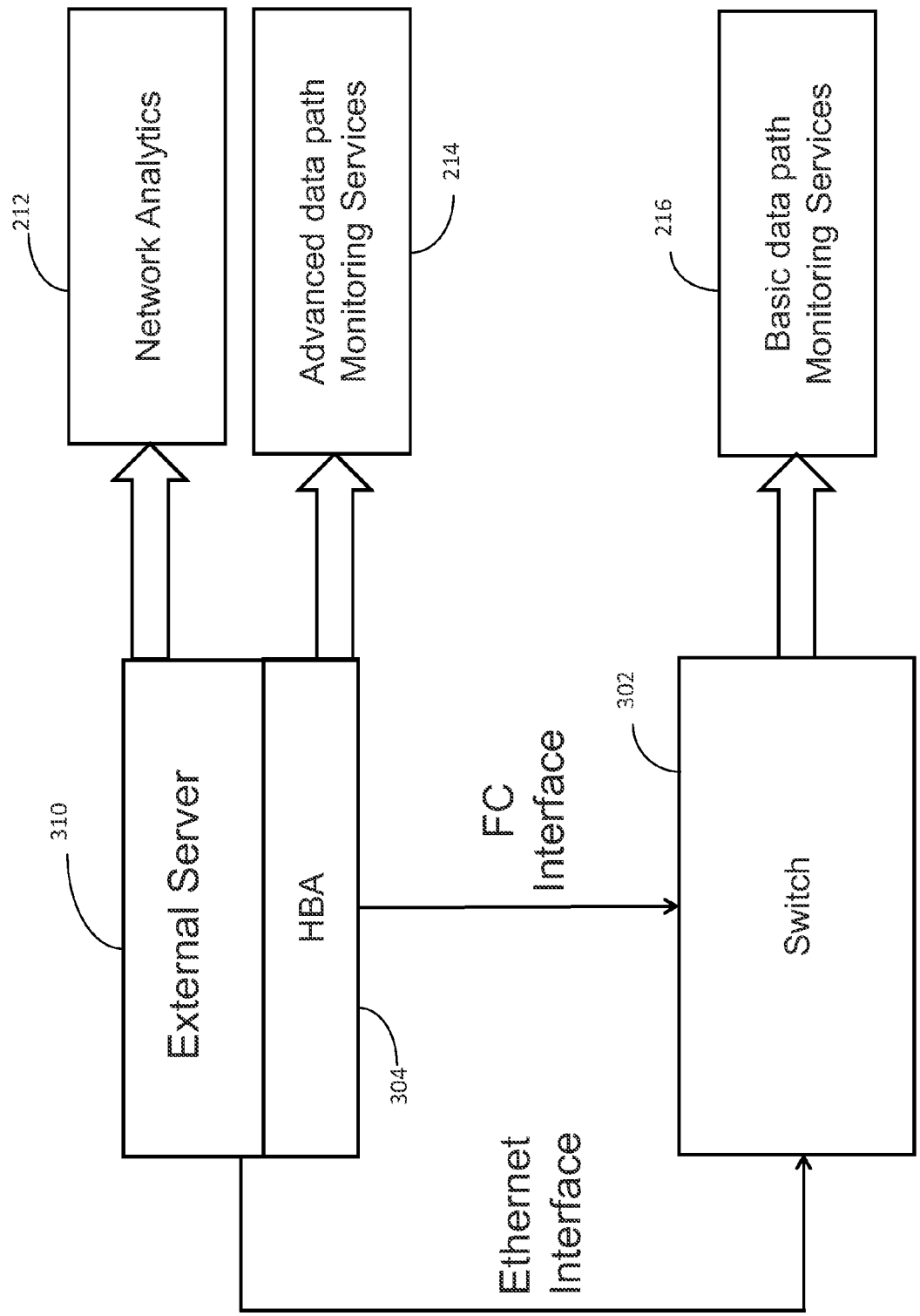
FIG. 3 is a block diagram of a second embodiment of an analysis system according to the present invention.

FIG. 3 illustrates an alternate embodiment in which the HBA is included in the external server 310. The HBA 304 again provides the advanced data path monitoring services 214, but this time it operates from the external server 310. The external server 310 in turn provides the network analytics 212. The switch 302 provides the basic data path monitoring services 216. The external server 310 is coupled to the switch 302 by an Ethernet interface and the HBA 304 is coupled to the switch 302 through an FC interface.

The HBAs included in the switch or the external server (external station) for diagnostic purposes are programmed not to handle normal FCP traffic with a server but to perform higher level protocol analysis, such as monitoring exchanges, LUNs, and VM/LUN/LBA ranges and developing SCSI statistics on the flows, such as count/MIN/MAX/AVG/timeout stats for I/Os, automatic base-lining of I/O stats to detect outliers causing performance issues and VM level stats based on LBA range monitors. In addition, the HBAs are configured to detect protocol exceptions. The HBAs can also perform other normal FC analyzer operations, such as SCSI traffic generator or distance simulator, and provide copies of the captured frames to the management server for viewing with frame analysis tools. Because an HBA is significantly cheaper than an FC analyzer (with prices in the range from $500 to $1,000, as compared to starting at $20,000 and reaching $50,000, at the time of this writing) the HBAs can be installed in many more locations, preferably in every switch. This would further reduce costs as an embedded solution is cheaper than an add-in solution. Moreover, because the monitoring is done in many more locations in the network, a significantly more complete analysis can be performed.

Locating an HBA in a switch simplifies mirroring of desired frames as all routing is handled internally to the switch, with the HBA/switch combination providing data over the management Ethernet port to a management server.

To maintain performance, preferably only protocol relevant frames are mirrored to the HBAs, such as the FCP_CMND command frame, the FCP_XFER_RDY transfer ready frame and the RCP_RSP response frame and the related link control frames, such as ACK acknowledgement frames, LS_RJT reject frames, LS_BSY busy frames and the like. Generally, the FCP_DATA data frames and related link control frames are not forwarded to the HBAs.

With the data provided from the HBAs, in conjunction with the normal diagnostic and statistics data available from the switch itself, the management server can correlate events end-to-end, correlate I/O error stats collected from the fabric with server stats, and correlate performance stats collected from the fabric with server stats, as a few examples.

Figure 4:
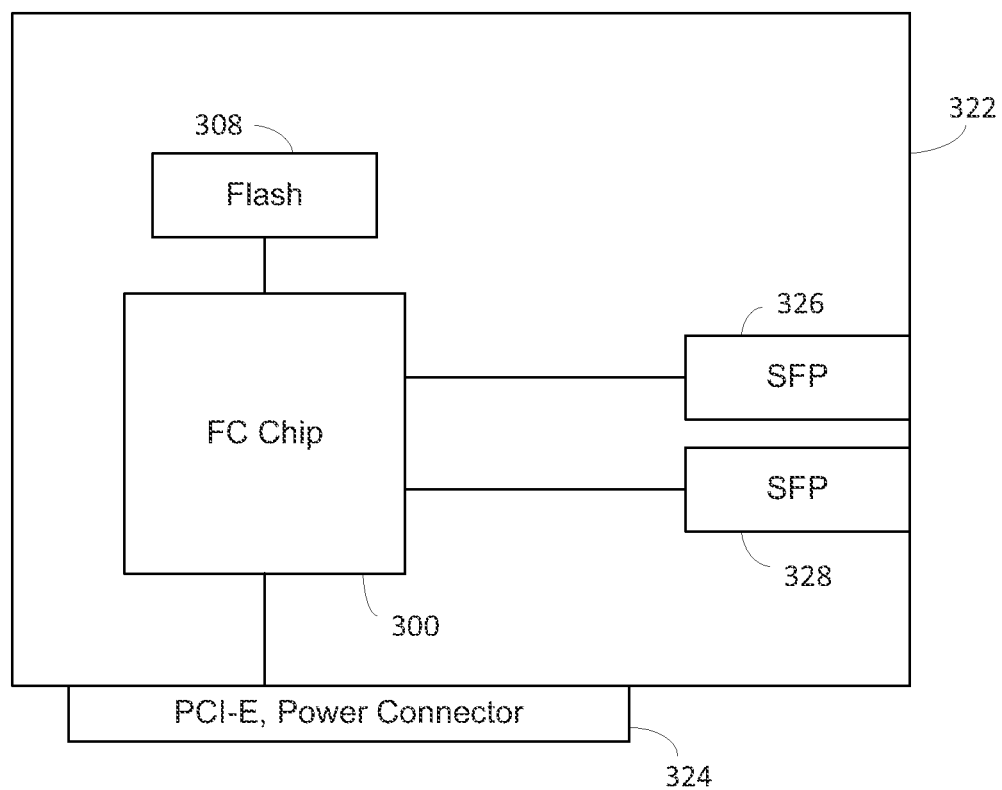
FIG. 4 is a block diagram of an HBA according to the present invention.

FIG. 4 illustrates an exemplary HBA, as a PCI-E adapter card block 322. An FC chip 300 is connected to a PCI-E and power connector block 324 for communication of PCI-E signals, power and clock. The FC chip 300 is also connected to SFP module blocks 326 and 328. The SFP modules receive optoelectronic converters for use with fiber optic cabling, as commonly used in Fibre Channel. Flash memory 308 holds the firmware for the CPUs, which are embedded in the FC chip 300.

Figure 5:
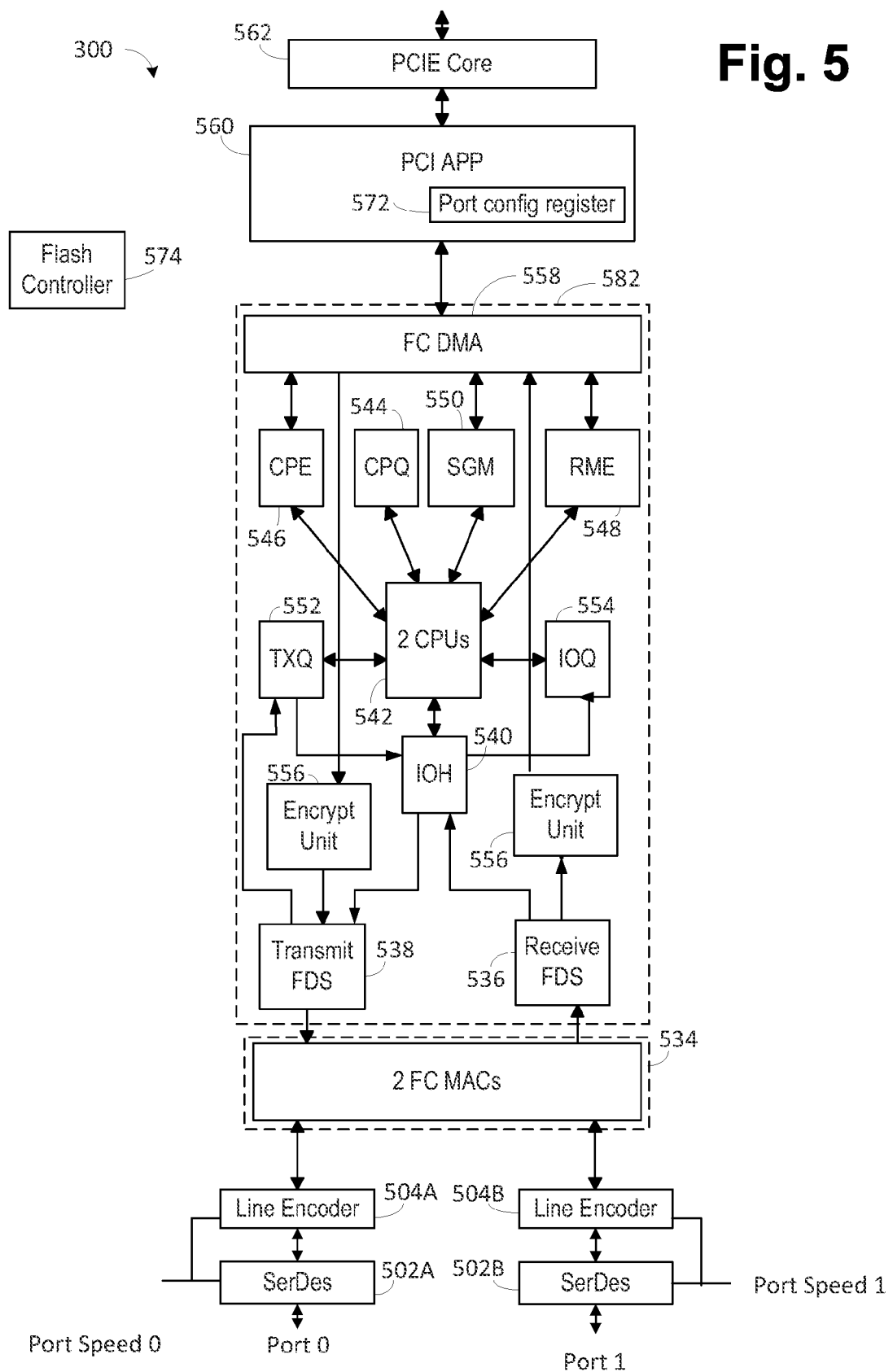
FIG. 5 is a block diagram of an FC chip used in the HBA of FIG. 4.

FIG. 5 illustrates a detailed block diagram of the FC chip 300. The FC chip 300 is formed by various modules. They are briefly listed below in table form, with more detailed description following the table.

TABLE 1

Description of the FC chip 300 modules

| | |
|---|---|
| Serdes 502 | Serializer/deserializer that can be configured as 8/4/2/1G FC or 10/1G Ethernet. |
| Line Encoder 504 | Performs 8b/10b or 60b/66b encoding and decoder, depending on protocol and speed. 8/4/2/1G FC uses 8b/10b. |

TABLE 1-continued

Description of the FC chip 300 modules

| | |
|---|---|
| FC MAC 534 | This block contains the FC MAC for traditional 8G FC. It also contains the XFM which is the 10G/14G FC MAC. |
| Rx FDS 536 | This holds the inbound FC frames received from RxA or from the FC MAC that are headed towards the IOH/CPU. |
| Tx FDS 538 | This holds the outbound FC frames that need to be transmitted to the FC MAC. |
| IOH 540 | This block maintains the IO State Table that holds the context for the FC IOs. It interfaces with a number of other blocks (IOQ, FDS, CPU, TxQ). |
| 112CPU0/ 1542 | These are two on-chip CPUs that are used for a number of purposes including initialization of the FC chip 300, setting up and tearing down of FC IOs, handling of exceptions, processing management frames and so on, but have the primary duty of analyzing the received FC frames as discussed above. The firmware for the CPUs is stored in off board flash memory 308. |
| CPQ 544 | This holds all the event queues that need CPU processing. CPQ interfaces with a number of blocks on the FC side to route events to the CPUs. |
| CPE 546 | This is the Command Prefetch block that interfaces with the host and DMAs commands to the CPUs for further processing. |
| RME 548 | This is the Reply Message block that is used by the CPU to send IO completion information to the host. |
| SGM 550 | This block holds the scatter-gather elements for all the IOs processed by the CPU and IOH. It performs DMAs to the host to prefetch/fetch scatter gather vectors. |
| TxQ 552 | This structure holds all the queues and frame related information for Tx frames which are headed towards the TXA or the FC MAC. |
| IOQ 554 | This block contains all the IO related queues that are directed towards the host, for FC frames. |
| Encrypt Unit 556 | This block contains encryption/decryption logic to perform encryption and decryption operations if needed. |
| FC DMA 558 | This block contains all the upstream and downstream data DMA engines that transfer frames from the FDS to the host or vice-versa. |
| PCI APP 560 | This collects DMA requests from FC-DMA and sends them to the PCI-E core. It routes completions for these requests back to the FC-DMA. It contains the SR-IOV related structures and logic that present a virtualized chip to the PCI-E. It interfaces to the PCI-E core. |
| PCI-E core 562 | This is the SR-IOV PCI-E core that has the Adaptation, Translation, Link and Physical Layer functionality for PCI-E bus transfers to/from the host. |

The PCI APP 560 provides the PCI-E interface to the FC chip 300. It can act as PCI-E Master and initiate DMA transfers. It can also function as a PCI-E Target for host accesses. The PCI APP 560 hides all the PCI-E complexity from the rest of the chip 300. It interfaces with PCI-E core 562 on one side and chip blocks on the other side and supports the following features:

High-Bandwidth data path to and from the host memory.
Cross-clock synchronization between System Clock and PCI-E Clock domains.
Supporting outstanding Memory Read Requests on PCI-E interface.
Supporting Max Read Request Size of 2 k bytes.
Supporting Max Payload Size of 2 k bytes.
Accepting 2 k byte aligned Memory Write requests from the DMA block.
Providing the register interface for host programming.
Providing Host-Local CPU Mailboxes.
Providing the shared interface to the rest of the chip for all four functions.

The PCI APP 560 connects the PCI-E core 562 to the LDMA block 526 and the FC DMA block 558. The SGM block 550 is connected to the FC DMA block 558 and the CPUs 542. The FC DMA block 526 allows for bus mastering in the FC chip 300, i.e., to move data to and from the host memory.

An I/O command is fetched via the PCI-E core 562 and PCI-E APP block 560 by the FC DMA block 558, which forwards the command to the CPQ block 544. Two Fibre Channel media access controllers (MACs) 534 provide an interface to a SAN fabric. An upstream path between the FC MACs 534 and the PCI-E APP block 560 comprises receive buffers in a receive frame data storage unit (RX FDS) block 536, an encryption unit 556, and the FC DMA block 558. A downstream path between the FC MACs 534 and the PCI-E APP block 560 comprises the FC DMA block 558, an Encryption Unit 556, and transmit buffers in a transmit frame data storage unit (Transmit FDS) block 538. The Tx FDS block 526 and the Transmission FDS block 538 communicate with the CPUs 542, and the Transmit FDS block 538 additionally communicates with the transmission queue (TXQ) block 552. A crossbar I/O handler (IOH) block 540 receives data from the FC MACs 534 and communicates with the Transmit FDS block 538, the CPUs 542, and the IOQ block 554. The IOQ block 554 communicates with the IOH block 540, the FC DMA block 558, and the CPU queue (CPQ) block 544. The CPQ block 544 receives data from the IOQ block 554, the TXQ block 552, and the FC DMA block 558, and transmits data to the CPUs 542.

Figure 6A:
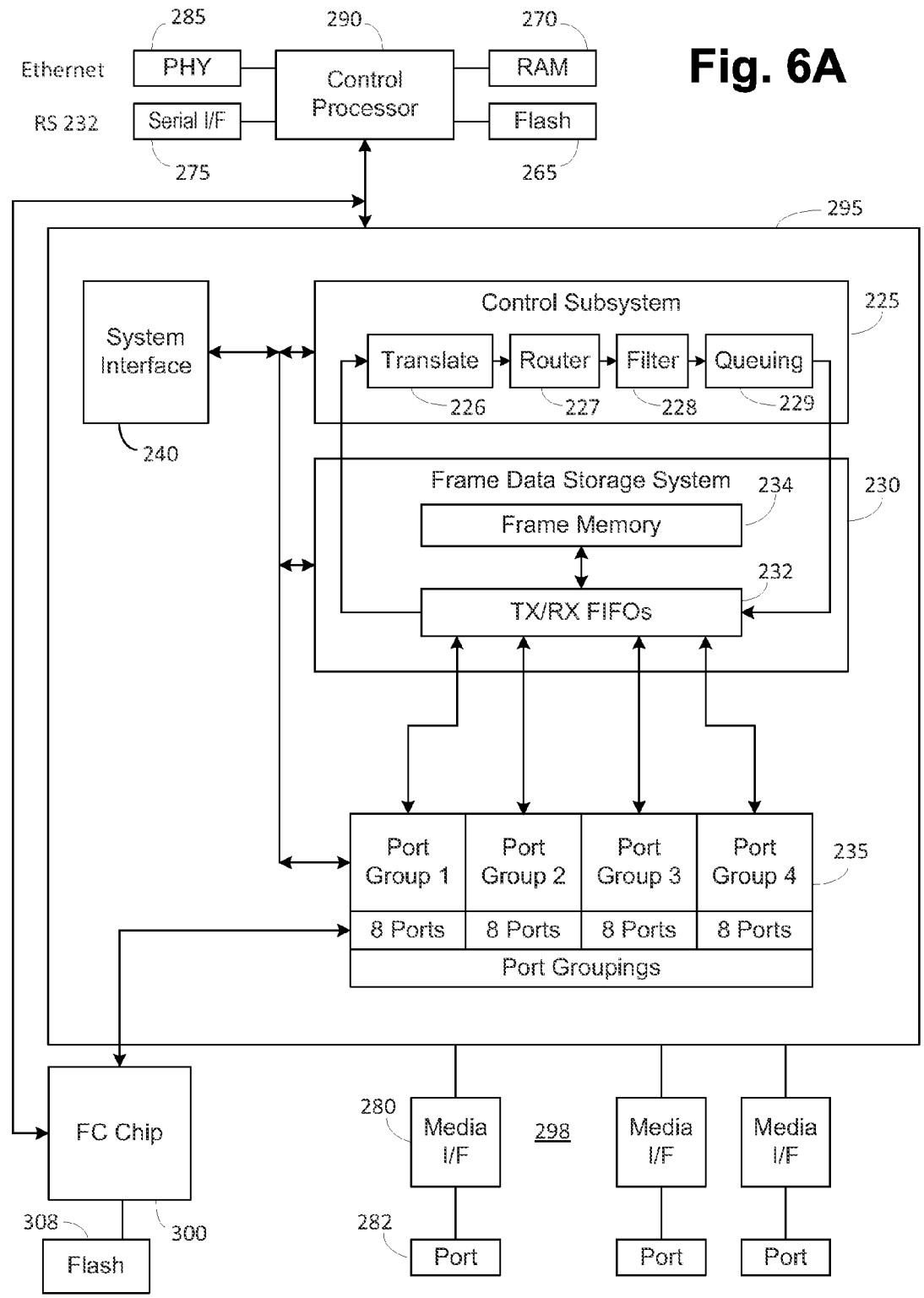
FIG. 6A is a block diagram of a first embodiment of a switch according to the present invention.

FIG. 6A is a block diagram of an exemplary switch 298. A control processor 290 is connected to a switch ASIC 295. The switch ASIC 295 is connected to media interfaces 280 which are connected to ports 282. Generally the control processor 290 configures the switch ASIC 295 and handles higher level switch 207 operations, such as the name server, the redirection requests, and the like. The switch ASIC 295 handles general high speed inline or in-band operations, such as switching, routing and frame translation. The control processor 290 is connected to flash memory 265 to hold the software, to RAM 270 for working memory and to an Ethernet PHY 285 and serial interface 275 for out-of-band management.

The switch ASIC 295 has four basic modules, port groups 235, a frame data storage system 230, a control subsystem 225 and a system interface 240. The port groups 235 perform the lowest level of packet transmission and reception. Generally, frames are received from a media interface 280 and provided to the frame data storage system 230. Further, frames are received from the frame data storage system 230 and provided to the media interface 280 for transmission out of port 282. The frame data storage system 230 includes a set of transmit/receive FIFOs 232, which interface with the port groups 235, and a frame memory 234, which stores the received frames and frames to be transmitted. The frame data storage system 230 provides initial portions of each frame, typically the frame header and a payload header for FCP frames, to the control subsystem 225. The control subsystem 225 has the translate 226, router 227, filter 228 and queuing 229 blocks. The translate block 226 examines the frame header and performs any necessary address translations, such as those that happen when a frame is redirected as described herein. There can be various embodiments of the translation block 226, with examples of translation operation provided in U.S. Pat. No. 7,752,361 and 7,120,728, both of which are incorporated herein by reference in their entirety. Those examples also provide examples of the control/data path splitting of operations. The router block 227 examines the frame header and selects the desired output port for the frame. The filter block 228 examines the frame header, and the payload header in some cases, to determine if the frame should be transmitted. In the preferred embodiment of the present invention, hard zoning is accomplished using the filter block 228. The queuing block 229 schedules the frames for transmission based on various factors including quality of service, priority and the like.

The FC chip 300 of FIG. 6A is connected to one or two ports in the port groups 235 to allow the FC chip 300 to receive FC frames that are mirrored and forwarded to it for analysis, as discussed above. The FC chip 300 has its PCI-E interface connected to the control processor 290. Further details on mirroring are provided in U.S. Publication No. 2011-0231570, entitled "Method and Apparatus for Mirroring Frames to a Remote Diagnostic System," which is incorporated herein by reference.

Figure 6B:
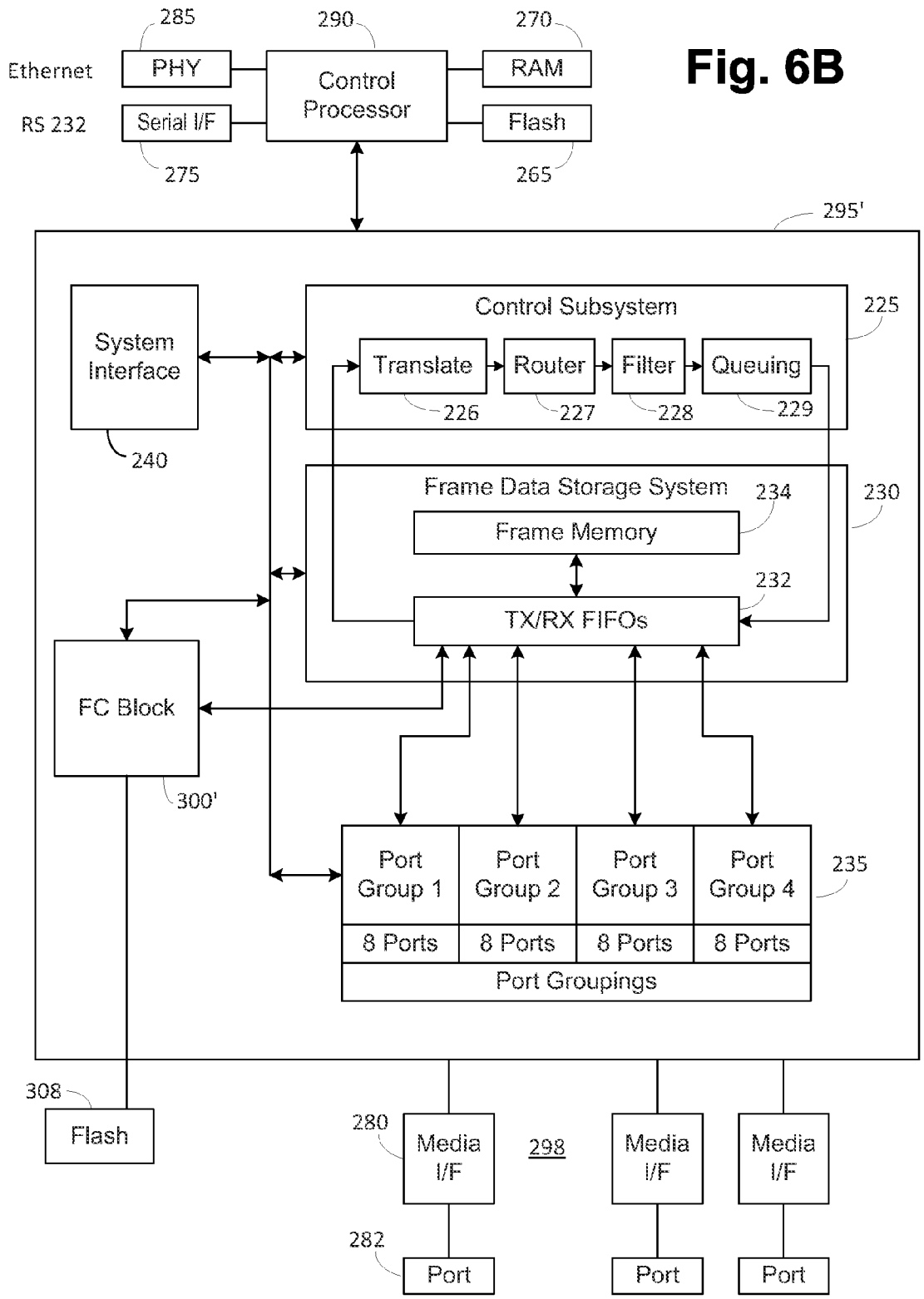
FIG. 6B is a block diagram of a second embodiment of a switch according to the present invention.

FIG. 6B is a variation of FIG. 6A where the FC chip 300 has been incorporated into a switch ASIC 295' as FC block 300'. In this embodiment, the FC block 300' is directly connected to the TX/RX FIFOs 232 rather than the port groups 235, thus freeing up the ports for external connections. The FC block 300' communicates with the control processor 290 via the system interface 240. This embodiment has a lower cost than the embodiment of FIG. 6A as one less chip is needed and additional external ports are present on the switch.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A network device comprising:
   a plurality of network ports;
   a control processor;
   memory coupled to said control processor;
   a switching component coupled to said control processor and said plurality of network ports, said switching component to perform switching of frames, said switching component further mirroring selected frames for data analysis;
   a host bus adaptor coupled to said control processor and connected to said switching component to receive said mirrored selected frames, said host bus adaptor configured such that it does not handle normal network traffic and said host bus adaptor configured to perform analysis of said mirrored selected frames and to provide said analysis to said control processor; and
   a management network interface coupled to said control processor to allow said control processor to forward said analysis to an external management station.

2. The network device of claim 1, wherein said host bust adapter is incorporated into said switching component.

3. The network device of claim 1, wherein said analysis comprises high level protocol analysis.

4. The network device of claim 3, wherein said switching component is configured to perform basic data path monitoring analysis.

5. The network device of claim 4, wherein said control processor is configured to forward said analysis and said basic data path monitoring analysis to said external management station.

6. The network device of claim 5, wherein said management station is configured to correlate said analysis and said basic data path monitoring analysis.

7. The network device of claim 1, wherein said selected frames comprise protocol relevant frames.

8. A method comprising:
receiving frames at a switching component coupled to a control processor;
mirroring a selected number of the received frames for data analysis;
transmitting the mirrored selected number of the frames to a host bus adaptor coupled to the control processor and to the switching component, said host bus adaptor configured such that it does not handle normal network traffic;
performing analysis of the mirrored selected number of frames by the host bus adaptor;
providing the analysis to the control processor; and
allowing the control processor to forward the analysis to an external management station.

9. The method of claim 8, wherein the host bust adapter is incorporated into the switching component.

10. The method device of claim 9, wherein the host bus processor is incorporated into the external management station.

11. The method of claim 8, wherein the analysis comprises high level protocol analysis.

12. The method of claim 11, further comprising the switching component performing basic data path monitoring analysis.

13. The method of claim 12, wherein the control processor is configured to forward the analysis and the basic data path monitoring analysis to the external management station.

14. The method of claim 13, wherein the management station is configured to correlate the analysis and the basic data path monitoring analysis.

15. The method of claim 11, wherein high level protocol analysis comprises monitoring exchanges, monitoring LUNs (Logical Unit Numbers), monitoring VM (Virtual Machine)/LUN/LBA (Logical Block Addressing) ranges or developing SCSI (Small Computer System Interface) statistics on the selected number of frames.

16. The method of claim 8, wherein the selected number of frames comprise protocol relevant frames.

17. The method of claim 8, wherein the control processor forwards the analysis to the external management station through a management network interface coupled to the control processor.

* * * * *